(12) United States Patent
Nagao et al.

(10) Patent No.: US 9,118,227 B2
(45) Date of Patent: Aug. 25, 2015

(54) ROTATING ELECTRICAL MACHINE

(71) Applicant: KABUSHIKI KAISHA YASKAWA DENKI, Kitakyushu (JP)

(72) Inventors: Toshio Nagao, Kitakyushu (JP); Mitsutoshi Nagao, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 393 days.

(21) Appl. No.: 13/661,038

(22) Filed: Oct. 26, 2012

(65) Prior Publication Data
US 2013/0119832 A1 May 16, 2013

(30) Foreign Application Priority Data
Nov. 10, 2011 (JP) ................. 2011-246361

(51) Int. Cl.
*H02K 5/22* (2006.01)
*H02K 11/00* (2006.01)
*H02K 5/20* (2006.01)
*H02K 9/19* (2006.01)

(52) U.S. Cl.
CPC .............. *H02K 5/20* (2013.01); *H02K 5/225* (2013.01); *H02K 11/0031* (2013.01); *H02K 9/19* (2013.01); *H02K 11/0073* (2013.01)

(58) Field of Classification Search
None
See application file for complete search history.

(56) References Cited

U.S. PATENT DOCUMENTS 6,750,574 B2 * 6/2004 Okazaki et al. ............. 310/68 B
7,095,146 B2 * 8/2006 Fukazawa et al. ............ 310/89

FOREIGN PATENT DOCUMENTS

| JP | 61-014871 U | 1/1986 |
| JP | 2001-231218 | 8/2001 |
| JP | 2003-324903 | 11/2003 |
| JP | 2010-051131 | 3/2010 |

OTHER PUBLICATIONS

Japanese Office Action for corresponding JP Application No. 2011-246361, Sep. 10, 2013.

* cited by examiner

Primary Examiner — Tran Nguyen
(74) Attorney, Agent, or Firm — Mori & Ward, LLP

(57) ABSTRACT

A rotating electrical machine includes: a frame including a first housing portion for housing an electronic component and a second housing portion formed integrally with the first housing portion for housing a rotator and a stator; and a bracket including a first communicating hole communicating with the first housing portion and a second communicating hole communicating with the second housing portion.

11 Claims, 5 Drawing Sheets

US 9,118,227 B2

ROTATING ELECTRICAL MACHINE

CROSS-REFERENCE TO RELATED APPLICATION

This application is based on Japanese Patent Application No. 2011-246361 filed with the Japan Patent Office on Nov. 10, 2011, the entire content of which is hereby incorporated by reference.

BACKGROUND

1. Technical Field

An embodiment of the disclosure relates to a rotating electrical machine.

2. Related Art

Traditionally, a rotating electrical machine for a vehicle has been known. For example, a motor for a vehicle (i.e., rotating electrical machine) disclosed in Japanese Patent Application Laid-Open No. 2003-324903 receives electrical power from an inverter module to drive a compressor for maintaining air conditioning and the like.

In the rotating electrical machine disclosed in this reference, a compressor housing for housing the compressor and a motor housing for housing the motor are coupled to each other along the axis direction. Furthermore, an outer frame for housing an electronic component such as the inverter module is coupled above the motor housing. Hereinafter, members for housing various mechanisms and/or parts such as the compressor housing, the motor housing, and the outer frame are referred to as "housing portions."

SUMMARY

A rotating electrical machine according to an aspect of an embodiment includes a frame and a bracket. The frame includes a first housing portion for housing an electronic component and a second housing portion formed integrally with the first housing portion for housing a rotator and a stator. The bracket includes a first communicating hole communicating with the first housing portion and a second communicating hole communicating with the second housing portion.

DETAILED DESCRIPTION

Figure 1:
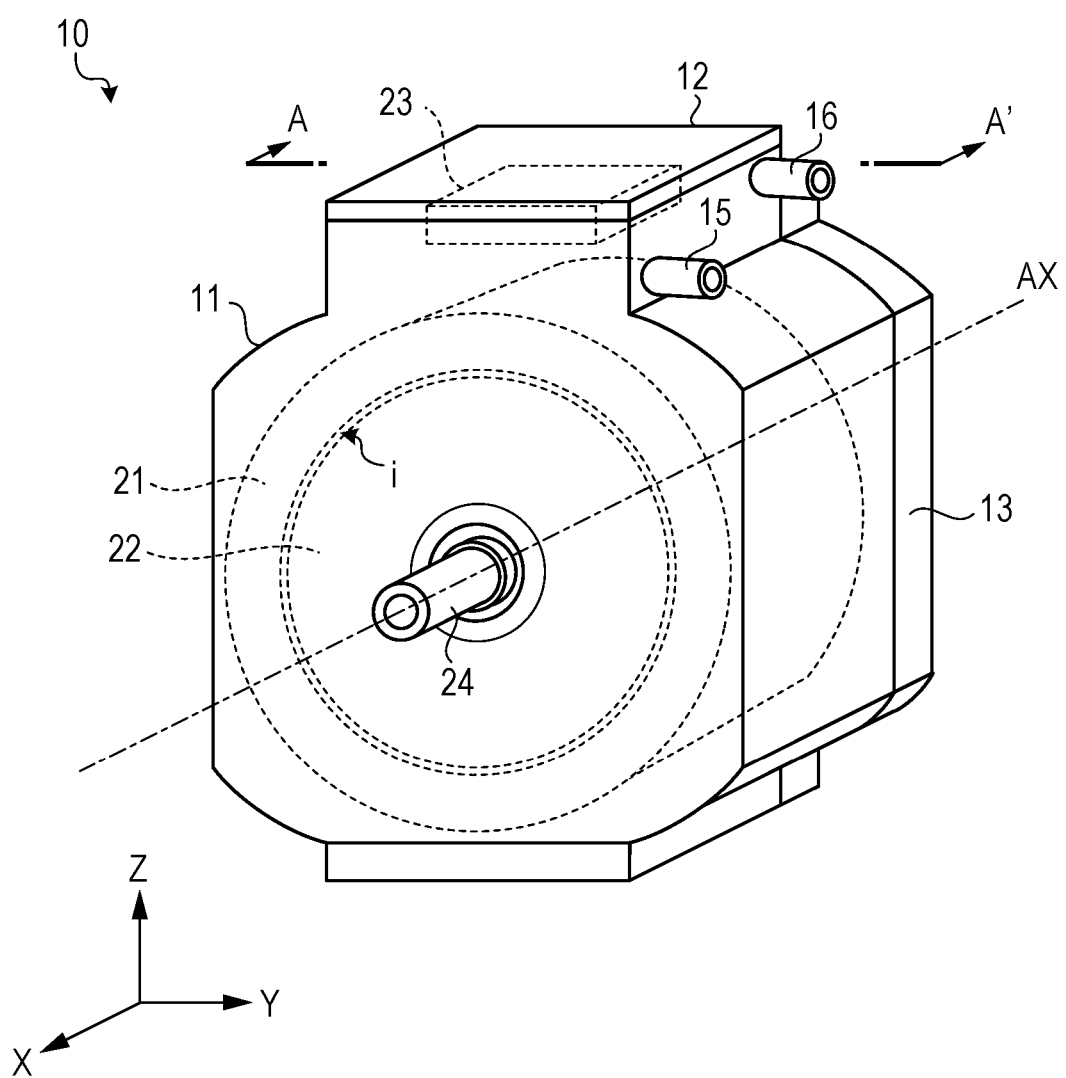
FIG. 1 is a diagram illustrating an exemplary configuration of a rotating electrical machine according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Hereinafter, an embodiment of a rotating electrical machine disclosed in the present application will be described in detail with reference to the accompanying drawings. However, the present disclosure is not limited to the embodiment described below.

Hereinafter, the rotating electrical machine according to the embodiment will be described as a generator for a vehicle.

First, an exemplary configuration of the rotating electrical machine according to the embodiment will be described with reference to FIG. 1. FIG. 1 is a diagram illustrating an exemplary configuration of a rotating electrical machine 10 according to the embodiment. FIG. 1 is a diagram illustrating the rotating electrical machine 10, seen from obliquely above on the load side.

In addition, a three-dimensional orthogonal coordinate system is shown in FIG. 1 in order to facilitate the explanation. With regard to the Z axis of the coordinate system, the vertically upward direction is the positive direction. The orthogonal coordinate system is shown in other diagrams which are referred to when making explanations below.

In the following description, as for the several identical components, only one component may be given a reference sign and other components may not be given reference signs.

As shown in FIG. 1, the rotating electrical machine 10 includes a frame 11, a first cover 12, and a bracket 13. The frame 11 has a substantially tubular shape with an undersurface. Within the frame 11, drive units of the rotating electrical machine 10 such as a stator 21 and a rotator 22, and an electronic component 23 are housed.

The stator 21 includes a plurality of annular magnetic steel sheets. These magnetic steel sheets are laminated on each other. Accordingly, the stator 21 has a tubular shape. An outer peripheral surface of the stator 21 is fixed to an inner peripheral surface of the frame 11. That is, the inner peripheral surface of the frame 11 is in contact with an outer surface of the stator 21.

In addition, the rotator 22 is provided inside the stator 21 with a predetermined gap i therebetween. The rotator 22 has a shaft 24 serving as a rotation axis. The shaft 24 extends in the X direction in the diagram, passing through the rotator 22. The shaft 24 is pivotally supported by bearings (described later). The bearings are provided on the load side and the side opposite to the load side of the shaft 24. Accordingly, the rotator 22 can freely rotate around an axis AX in the diagram, which is the shaft center of the shaft 24.

The electronic component (heat-generating component) 23 is provided above the stator 21. The electronic component 23 is housed in a first housing portion (described later) that is provided in the frame 11. An opening is provided on an upper surface of the first housing portion. The first cover 12 is attached to this opening.

Note that, the electronic component (circuit components) 23 includes, for example, an inverter, a circuit component for controlling the inverter, an electronic component constituting a coil switch, a capacitor, an IGBT, and a switching element.

In addition, although not illustrated in FIG. 1, an opening is provided also on the side opposite to the load side of the frame 11. The bracket 13 is attached so as to cover an end face on the side opposite to the load side of the frame 11 including this opening. Detailed configuration of the side opposite to the load side of the frame 11 will be described later with reference to FIG. 3.

In addition, the frame 11 includes an inlet 15 and an outlet 16 for refrigerant. In the present embodiment, as one example, the outlet 16 is provided at a higher position than the inlet 15.

Figure 2:
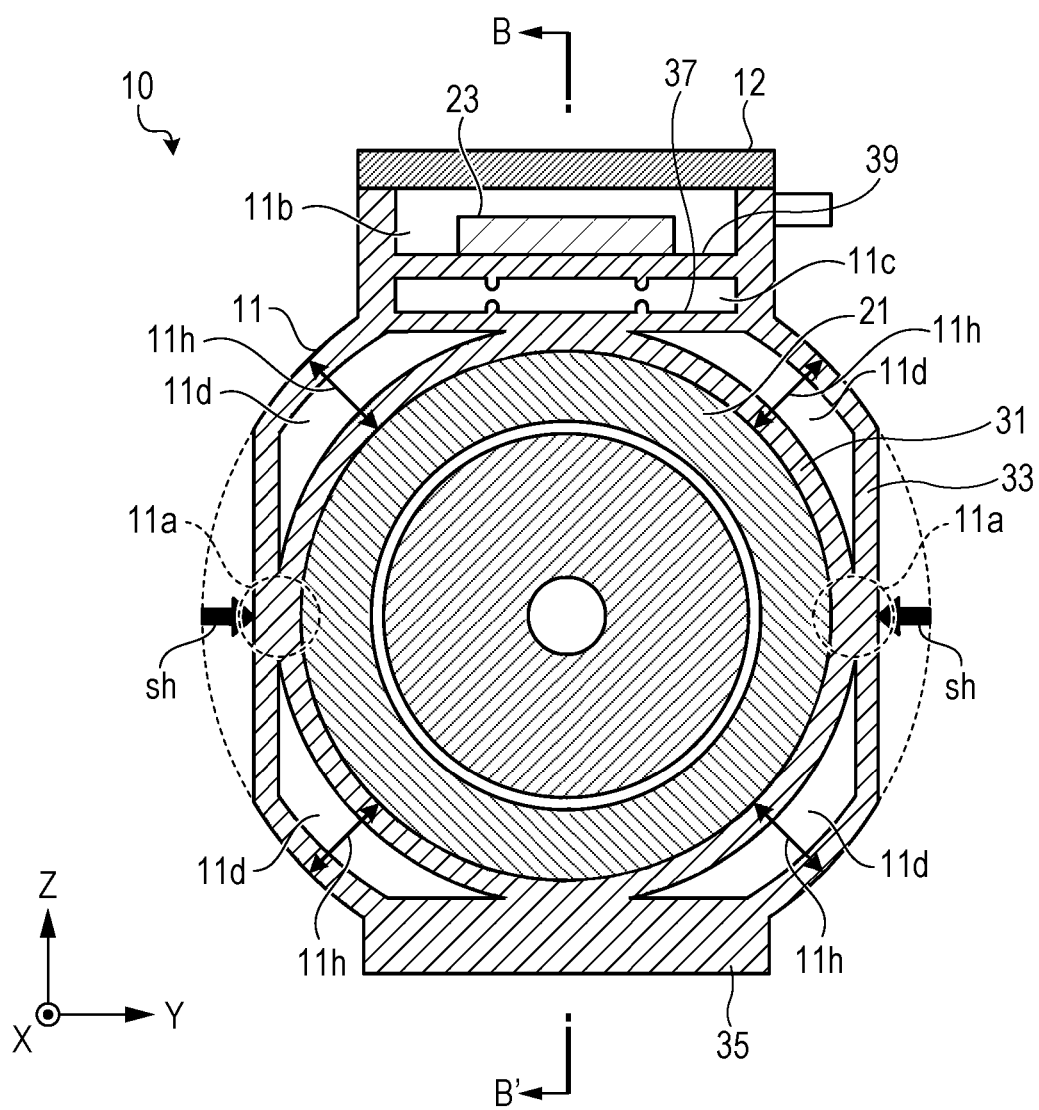
FIG. 2 is a cross-sectional diagram taken along the line A-A' of FIG. 1.

FIG. 2 is a cross-sectional diagram (cross-sectional diagram taken along the line A-A') regarding the YZ plane including the line A-A' of FIG. 1. The exemplary configuration of the rotating electrical machine 10 will be described in further detail with reference to FIG. 2.

As shown in FIG. 2, the frame 11 includes an inner wall 31 having a shape corresponding to the shape of the outer periphery of the stator 21, an outer wall 33 formed outside the inner wall 31, and a bottom portion 35. Furthermore, the frame 11 includes a first plate-like portion 37 and a second plate-like portion 39 that are provided above the stator 21. The first plate-like portion 37 and the second plate-like portion 39 are provided almost parallel to each other.

In the frame 11, the inner wall 31, the outer wall 33, the bottom portion 35, the first plate-like portion 37, the second plate-like portion 39, and end faces (described later) are integrally formed. That is, the frame 11 is an integrally-formed frame.

The outer wall 33 basically has a substantially cylindrical shape. An upper part of the outer wall 33 extends substantially along the Z axis, and is in contact with the first plate-like portion 37 and the second plate-like portion 39. The upper part of the outer wall 33 constitutes a first housing portion 11$b$ and a first refrigerant passage 11$b$ (both of which are described later) together with the first plate-like portion 37 and the second plate-like portion 39.

Both side portions of the outer wall 33 extend substantially along the Z axis. Accordingly, the width (diameter) of the frame 11 is narrowed at the both side portions by an amount indicated by an arrow sh in the diagram. The both side portions of the frame 11 are referred to as first portions 11$a$. Moreover, portions of the frame 11 corresponding to arc-like portions of the outer wall 33 are referred to as second portions 11$h$. The second portions 11$h$ are provided at four locations of the frame 11 (above and below the first portions 11$a$), as shown in FIG. 2. The first portions 11$a$ are located inwardly with respect to the second portions 11$h$ by the amount indicated by the arrow sh (the distance from the center (axis AX) is short).

As described, in the rotating electrical machine 10, the frame 11 includes the first portions 11$a$. Accordingly, the width of the rotating electrical machine 10 can be reduced without changing the outer diameter of the stator 21. That is, the rotating electrical machine 10 can be downsized while the output from the rotating electrical machine 10 is maintained.

Moreover, the frame 11 includes the first housing portion 11$b$, the first refrigerant passage 11$c$, and second refrigerant passages 11$d$. The first housing portion 11$b$ is formed between the first cover 12 and the second plate-like portion 39. The electronic component 23 is housed in the first housing portion 11$b$, as already described.

The first refrigerant passage 11$c$ is formed between the first plate-like portion 37 and the second plate-like portion 39 (between the first housing portion 11$b$ and the stator 21). The second plate-like portion 39 serving as a ceiling portion of the first refrigerant passage 11$c$ is an undersurface of the first housing portion 11$b$. Therefore, the refrigerant flowing through the first refrigerant passage 11$c$ can efficiently cool the electronic component 23 from below through the second plate-like portion 39.

The second refrigerant passages 11$d$ are each provided between the inner wall 31 and the outer wall 33 of the second portion 11$h$. In other words, as shown in FIG. 2, in the rotating electrical machine 10, the second refrigerant passage 11$d$ is formed at each of the second portions 11$h$ located above and below the first portions 11$a$.

The second refrigerant passages 11$d$ extend along the central axis of the inner periphery of the frame 11 (i.e., the axis AX shown in FIG. 1). By forming the second refrigerant passages 11$d$ in such a shape, the refrigerant flowing through the second refrigerant passages 11$d$ can efficiently cool the stator 21.

Figure 3:
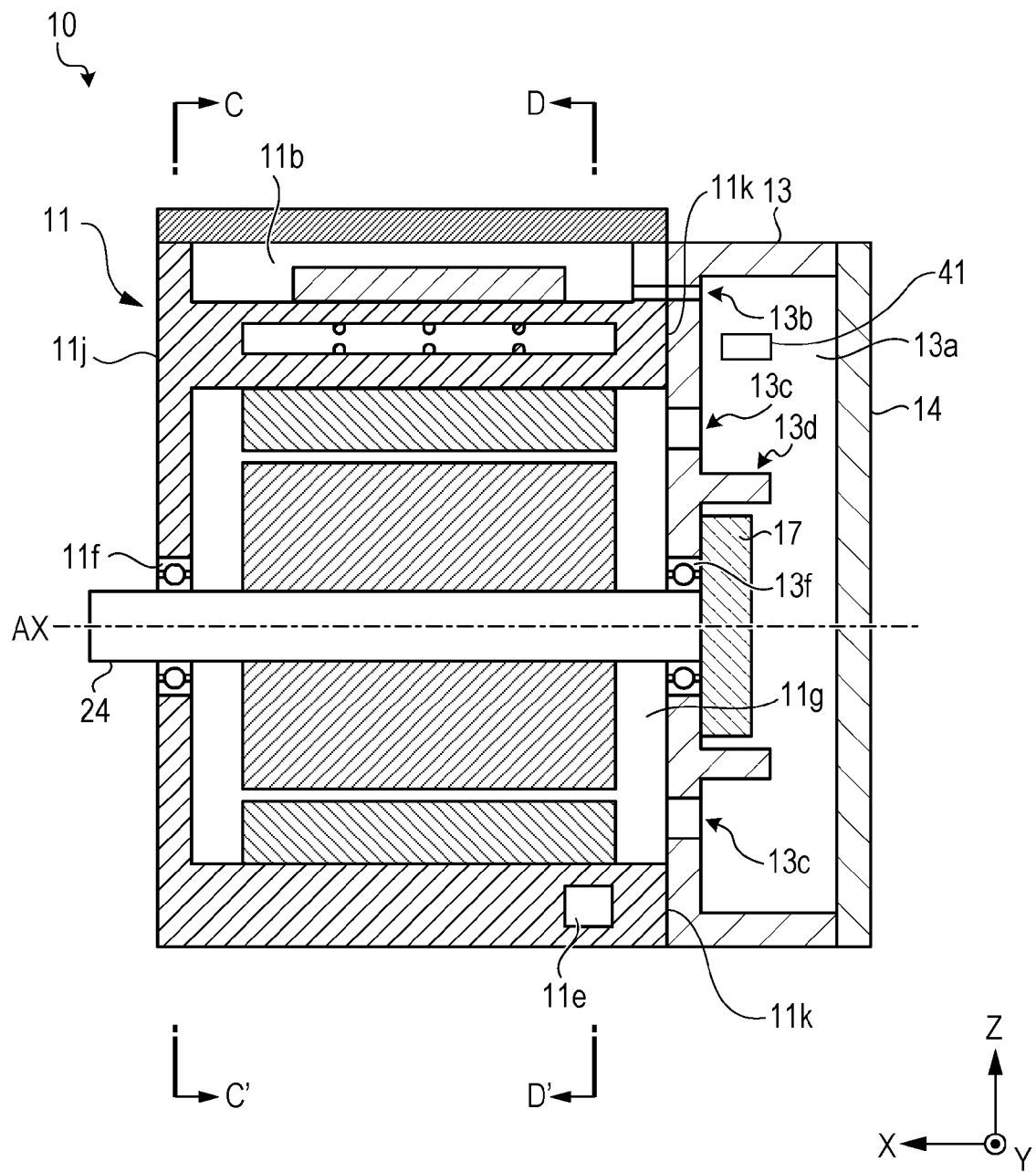
FIG. 3 is a cross-sectional diagram taken along the line B-B' of FIG. 2.

FIG. 3 is a cross-sectional diagram taken along the line B-B' of FIG. 2, viewing the internal structure of the rotating electrical machine 10 from the side (positive direction of the Y axis). The internal structure of the rotating electrical machine 10 will be described with reference to FIG. 3.

As shown in FIG. 3, the frame 11 includes end faces 11$j$ and 11$k$ substantially orthogonal to the axis AX. The first housing portion 11$b$ and a second housing portion 11$g$ are provided so as to be adjacent to the end face 11$k$. The second housing portion 11$g$ houses the drive unit of the rotating electrical machine 10 (including the stator 21 and the rotator 22).

In addition, as shown in FIG. 3, the frame 11 further includes connecting passages 11$e$. The connecting passages 11$e$ connect the second refrigerant passages 11$d$ (see FIG. 2). The connecting passages 11$e$ are formed in the vicinity of the end faces 11$j$ and 11$k$ of the frame 11. Moreover, the connecting passages 11$e$ are formed between the inner wall 31 and the outer wall 33, as with the second refrigerant passages 11$d$.

Note that, in FIG. 3, only the connecting passage 11$e$ formed in the vicinity of the end face 11$k$ on the side opposite to the load side of the frame 11 is shown. However, the connecting passages 11$e$ are also formed in the vicinity of the end face 11$j$ on the load side of the frame 11. This will be described later with reference to FIG. 5A. In addition, the frame 11 holds an annular bearing 11$f$ at the end face 11$j$ on the load side.

As shown in FIG. 3, the bracket 13 is attached to the opening on the side opposite to the load side of the frame 11. The bracket 13 holds an annular bearing 13$f$. The bearing 13$f$ and the aforementioned bearing 11$f$ pivotally support the shaft 24.

In addition, a second cover 14 is attached to an opening of the bracket 13. A third housing portion 13$a$ is formed by the bracket 13 and the second cover 14. The third housing portion 13$a$ houses a resolver 17. The resolver 17 is attached to an end of the shaft 24 on the side opposite to the load side. The resolver 17 is a detection device for detecting a rotation angle of the shaft 24.

The bracket 13 includes a first communicating hole 13$b$. The first communicating hole 13$b$ connects the first housing portion 11$b$ and the third housing portion 13$a$. A cable connecting a member within the first housing portion 11$b$ and a member within the third housing portion 13$a$ is provided through the first communicating hole 13$b$. The bracket 13 further includes a second communicating hole 13$c$. The second communicating hole 13$c$ connects the second housing portion 11$g$ and the third housing portion 13$a$. The second communicating hole 13$c$ is arranged to be almost parallel to the first communicating hole 13$b$. A cable connecting a member within the second housing portion 11$g$ and a member within the third housing portion 13$a$ is provided through the second communicating hole 13$c$.

As described, the cables over the housing portions can be easily provided by virtue of the first communicating hole 13$b$ and the second communicating hole 13$c$.

For example, a cable (e.g., signal line) connected to the resolver 17 can be guided to the first housing portion 11b through the first communicating hole 13b.

In addition, a cable (e.g., strong electric wire) connected to the stator 21 within the second housing portion 11g can be guided to the third housing portion 13a through the second communicating hole 13c. Moreover, the cable can be guided to the first housing portion 11b through the first communicating hole 13b.

Note that, in the third housing portion 13a, a cable connecting portion 41 connecting the cable guided from the second housing portion 11g to the third housing portion 13a and the cable guided from the third housing portion 13a to the first housing portion 11b may be provided. In this case, it is preferable that the cable connecting portion 41 be provided at a location closer to the first housing portion 11b than the resolver 17 within the third housing portion 13a. This portion has a sufficient space for providing the cable connecting portion 41.

By providing the cable connecting portion 41 within the third housing portion 13a, various members such as the resolver 17 and the cable connecting portion 41 and cables and the like can be collectively housed in the third housing portion 13a. Therefore, maintenance can be more easily carried out.

In addition, the bracket 13 includes a side wall 13d for surrounding the resolver 17. The side wall 13d can reduce influence on the resolver 17 exerted by magnetism generated by large current flowing through the drive unit (improve noise resistance of the resolver 17). Moreover, a lid to cover the resolver 17 may be provided to the side wall 13d. Accordingly, noise resistance of the resolver 17 can be further improved.

Figure 4A:
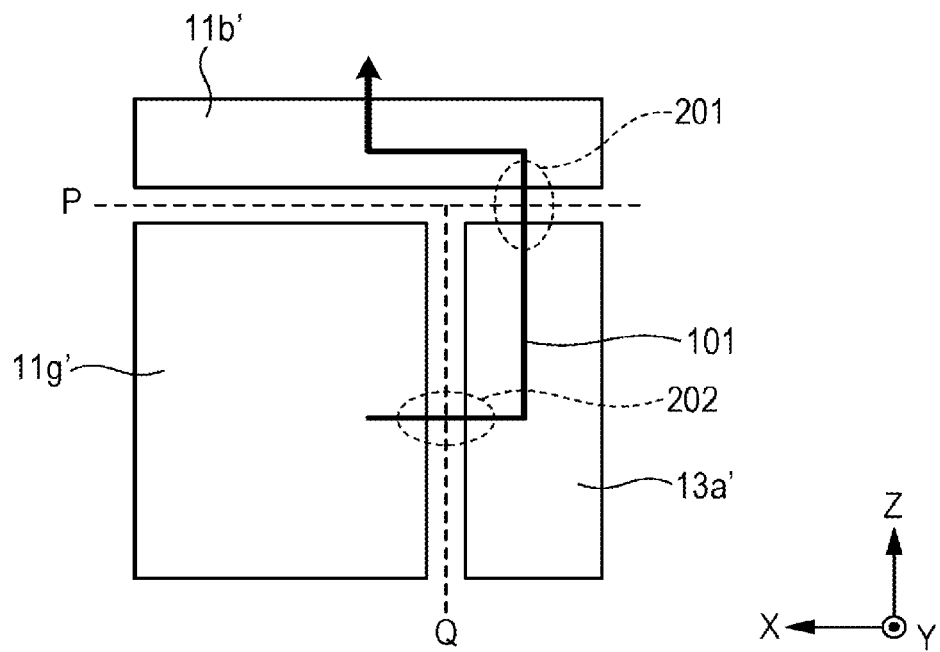
FIG. 4A is a pattern diagram illustrating an internal structure of a rotating electrical machine known to the inventors.
Figure 4B:
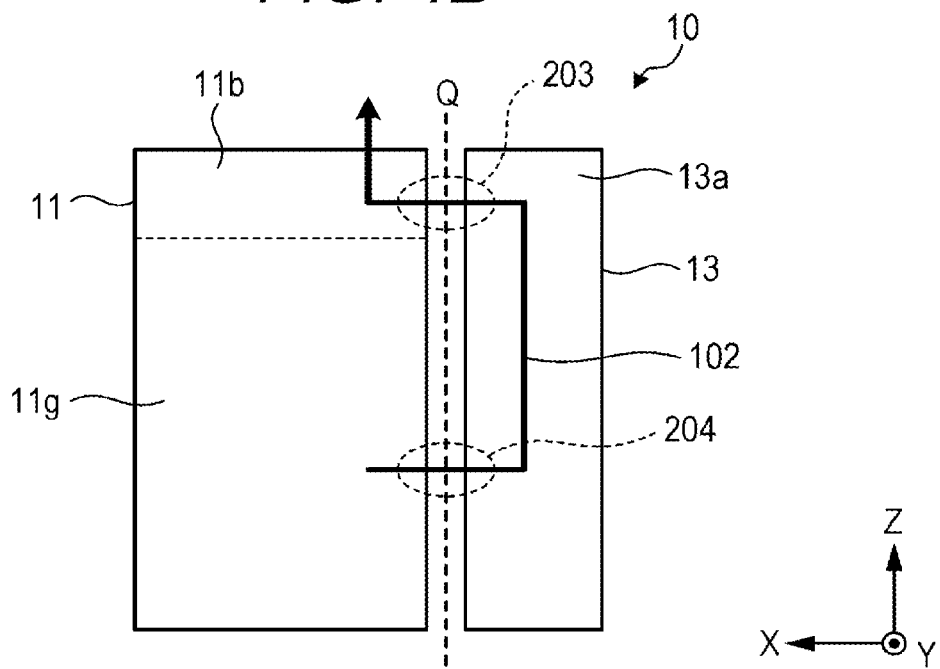
FIG. 4B is a pattern diagram illustrating an internal structure of the rotating electrical machine according to the embodiment.

Here, effects obtained by the internal structure of the rotating electrical machine 10 will be described in more detail with reference to FIGS. 4A and 4B. FIG. 4A is a pattern diagram illustrating an internal structure of a rotating electrical machine known to the inventors. On the other hand, FIG. 4B is a pattern diagram illustrating the internal structure of the rotating electrical machine 10.

The rotating electrical machine known to the inventors illustrated in FIG. 4A includes a first housing portion 11b', a third housing portion 13a', and a second housing portion 11g'. The first housing portion 11b', the third housing portion 13a', and the second housing portion 11g' correspond to the first housing portion 11b, the third housing portion 13a, and the second housing portion 11g of the rotating electrical machine 10, respectively.

In the rotating electrical machine known to the inventors illustrated in FIG. 4A, similarly to the rotating electrical machine 10, an electronic component 23, a resolver 17 and/or a cable connecting portion 41, and a drive unit are housed in the first housing portion 11b', the third housing portion 13a', and the second housing portion 11g', respectively. The configuration of the rotating electrical machine known to the inventors is shown only for the purpose of explanation. For example, a compressor and the drive unit may be housed in the second housing portion 11g' and the third housing portion 13a', respectively.

As shown in FIG. 4A, in the rotating electrical machine known to the inventors, each of the first housing portion 11b', the second housing portion 11g', and the third housing portion 13a' is formed by separate structures. Therefore, a portion facing the XY plane including the axis P and a portion facing the YZ plane including the axis Q of each member are main connection and sealing portions.

As described, in the rotating electrical machine known to the inventors, the connection and sealing portions exist on two planes substantially orthogonal to each other. Therefore, it is possible that positions of the members are slightly and relatively displaced at these connection and sealing portions.

In addition, a cable is arranged as indicated by an arrow 101 in FIG. 4A, for example. Specifically, the cable mainly extends in the X direction between the second housing portion 11g' and the third housing portion 13a' (see the portion surrounded by a closed curve 202 in the diagram). Moreover, the cable mainly extends in the Z direction between the first housing portion 11b' and the third housing portion 13a' (see the portion surrounded by a closed curve 201 in the diagram).

Therefore, in the rotating electrical machine known to the inventors, a worker arranges the cable so as to be directed to several different directions. Accordingly, there is a case where it is very difficult to arrange the cable depending on the volume of the third housing portion 13a', the location to provide the rotating electrical machine, or the like.

On the other hand, in the rotating electrical machine 10, the frame 11 is integrally formed so as to include the first housing portion 11b and the second housing portion 11g, as shown in FIG. 4B. In addition, the bracket 13 that can cover the entire end face 11k is attached at the end face 11k on the side opposite to the load side of the integral frame 11. That is, the bracket 13 is larger than a bracket known to the inventors (i.e., has a larger volume).

Moreover, in the rotating electrical machine 10, the first communicating hole 13b and the second communicating hole 13c are provided to the bracket 13 as described with reference to FIG. 3.

Therefore, in the rotating electrical machine 10, the number of the components can be reduced. Accordingly, it is possible to reduce the possibility that positions of members of the separate structures are relatively displaced.

In addition, as shown in FIG. 4B, main connection and sealing portions of the rotating electrical machine 10 are flat portions facing the YZ plane including the axis Q. Therefore, a worker can easily and surely make connection and sealing between the members. That is, the worker can efficiently manufacture and maintain the rotating electrical machine 10.

In addition, in the rotating electrical machine 10, the second communicating hole 13c and the first communicating hole 13b are arranged so as to be almost parallel to one another as shown in FIG. 3. Therefore, as shown in FIG. 4B, a cable arranged between the second housing portion 11g and the third housing portion 13a and between the third housing portion 13a and the first housing portion 11b can mainly extend in the X direction (see the portions surrounded by closed curves 204 and 203 in the diagram).

Therefore, the worker can arrange the cable in substantially the same direction at both locations. As indicated by the arrow 101 in FIG. 4A and an arrow 102 in FIG. 4B, the cable is arranged almost similarly in the rotating electrical machine 10 and the rotating electrical machine known to the inventors. However, in the rotating electrical machine 10, the cable can be arranged more easily than before. That is, work efficiency of the worker can be improved.

In addition, the rotating electrical machine 10 includes the bracket 13 that is larger than before. Therefore, in the rotating electrical machine 10, the volume of the third housing portion 13a can be larger than before. Accordingly, a sufficient space for providing internal components such as the resolver 17 and the aforementioned cable connecting portion 41 can be secured. By securing a space with sufficient size for providing the internal components, influence of noise on the internal components such as the resolver 17 can be reduced as compared to before. In addition, heat kept in the third housing portion 13a can be diffused more than before. As a result, the internal components can be protected more surely.

Figure 5A:
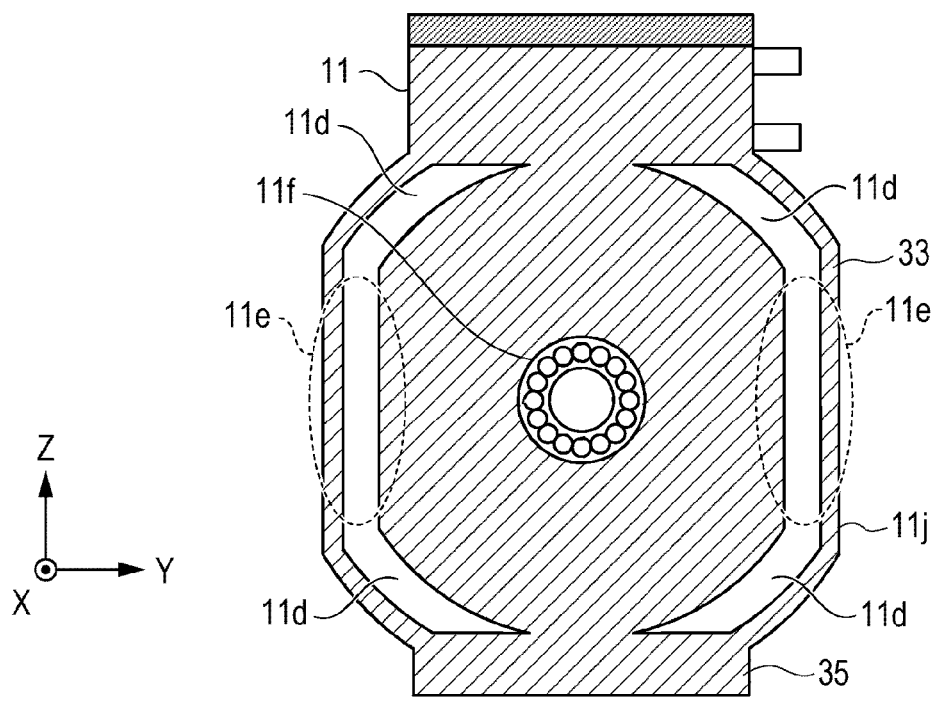
FIG. 5A is a cross-sectional diagram taken along the line C-C' of FIG. 3.
Figure 5B:
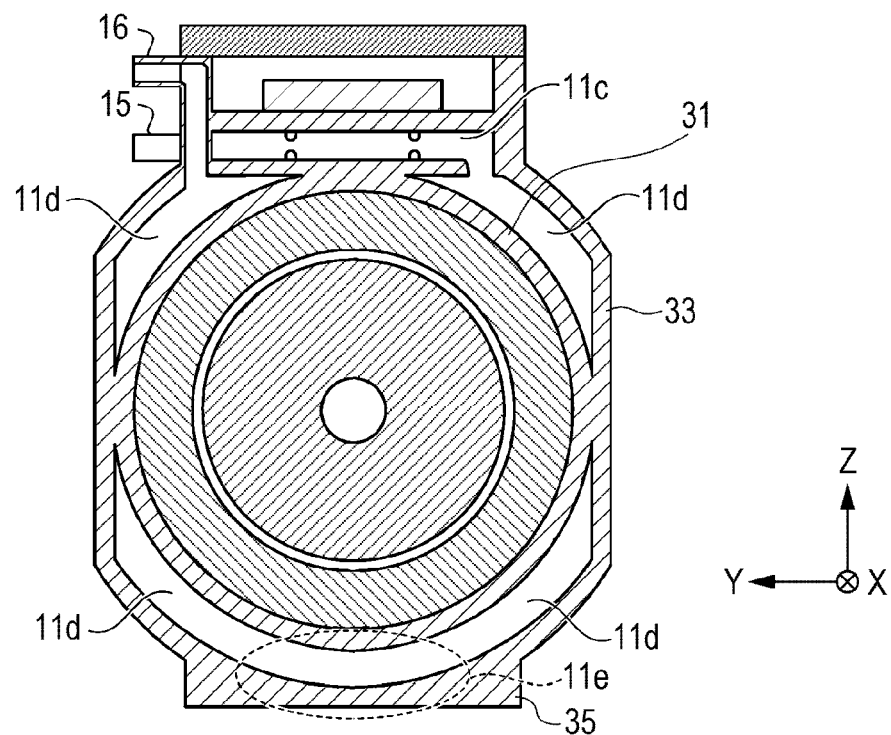
FIG. 5B is a cross-sectional diagram taken along the line D-D' of FIG. 3.

Next, the connecting passages 11e will be described with reference to FIGS. 5A and 5B. FIG. 5A is a cross-sectional diagram taken along the line C-C' of FIG. 3. FIG. 5B is a cross-sectional diagram taken along the line D-D' of FIG. 3.

As shown in FIG. 5A, the connecting passages 11e are provided in the vicinity of the end face 11j on the load side of the frame 11. The connecting passages 11e connect the second refrigerant passages 11d along the Z axis in the diagram.

As shown in FIG. 5A, the connecting passages 11e connect the second refrigerant passages 11d along the outer wall 33 of the frame 11. However, the location to provide the connecting passages 11e is not limited thereto. For example, the width of the connecting passages 11e may extend toward the vicinity of the outer circumference of the bearing 11f. Accordingly, efficiency of cooling the end faces of the stator 21 and the rotator 22 (see FIG. 1) can be further improved.

In addition, as shown in FIG. 5B, the connecting passage 11e is also provided in the vicinity of the end face 11k on the side opposite to the load side of the frame 11 (see FIG. 3). This connecting passage 11e connects the second refrigerant passages 11d formed below the first portions 11a (see FIG. 2) in the Y direction in the diagram.

As shown in FIG. 5B, one of the second refrigerant passages 11d formed above the first portions 11a (see FIG. 2) communicates with the first refrigerant passage 11c. On the other hand, the other second refrigerant passage 11d communicates with an outlet 16 for refrigerant.

In addition, the first refrigerant passage 11c communicates with the inlet 15 for the refrigerant. With this configuration, the rotating electrical machine 10 includes the continuous refrigerant passage. This refrigerant passage includes the inlet 15, the first refrigerant passage 11c, the second refrigerant passage 11d (upper right in FIG. 5B), the connecting passage 11e on the load side (right side in FIG. 5A), the second refrigerant passage 11d (lower right in FIG. 5B), the connecting passage 11e on the side opposite to the load side, the second refrigerant passage 11d (lower left in FIG. 5B), the connecting passage 11e on the load side (left side in FIG. 5A), the second refrigerant passage 11d (upper left in FIG. 5B), and the outlet 16, which are connected in this order. Flow of the refrigerant through such a continuous refrigerant passage can efficiently cool around the stator 21.

As described, the rotating electrical machine according to the embodiment includes the frame and the bracket. The frame includes the end faces substantially orthogonal to the rotation axis of the rotator. The frame includes the first housing portion for housing the electronic component and the second housing portion for housing the rotator and the stator. These first and second housing portions are provided to be adjacent to the end faces. The frame is formed integrally with these housing portions. The bracket is attached so as to cover the end faces. The bracket includes the communicating holes. These communicating holes connect the inside of the bracket to the first housing portion and the second housing portion.

Therefore, according to the rotating electrical machine according to the embodiment, work efficiency of a worker can be improved.

Incidentally, in the aforementioned embodiment, the frame has a substantially tubular shape with an undersurface. However, the shape of the frame is not limited to this, and the frame may have any shape as long as it has an opening in the axis direction.

In addition, in the aforementioned embodiment, the electronic component is arranged above the stator. However, the electronic component may be arranged in another location.

In addition, in the aforementioned embodiment, as an example, the width of the portion of the frame corresponding to the sides of the stator (both side portions of the frame) is narrow. However, the location and the shape of the narrowed portion of the frame may be suitably determined depending on the shape of a space to arrange the rotating electrical machine, a location to arrange the electronic component, or the like.

In addition, in the aforementioned embodiment, the rotating electrical machine has been described as a generator for a vehicle. However, the rotating electrical machine according to this disclosure may be used as another device (electric machinery, for example).

Moreover, in the present embodiment, the first communicating hole 13b and the second communicating hole 13c are arranged so as to be almost parallel to one another. However, the configuration is not limited to this, and the first communicating hole 13b and the second communicating hole 13c may not be arranged so as to be parallel to one another as long as they are provided at the same end faces of the frame 11.

Furthermore, the first portions 11a may be ones with the reduced thickness formed by reducing the diameter (see the arrow sh in the diagram) of a part of the outer peripheral surface of the frame 11.

Furthermore, the rotating electrical machine of this disclosure may be the following first to fifth rotating electrical machines. The first rotating electrical machine includes: a frame having end faces substantially orthogonal to a rotation axis of a rotator and formed integrally with a first housing portion and a second housing portion that are arranged along the end faces, the first housing portion housing an electronic component and the second housing portion housing the rotator and a stator; and a bracket having communicating holes communicating with the first housing portion and the second housing portion at the end faces, the bracket attached so as to cover the end faces.

The second rotating electrical machine is a rotating electrical machine according to the first rotating electrical machine, in which the bracket houses a detector for detecting a rotation angle of the rotation axis, and a first communicating hole that communicates with the first housing portion guides a cable connected to the detector to the first housing portion.

The third rotating electrical machine is a rotating electrical machine according to the second rotating electrical machine, in which a second communicating hole that communicates with the second housing portion guides a cable connected to the stator to the bracket from the first housing portion, and the first communicating hole guides the cable guided to the bracket to the first housing portion.

The fourth rotating electrical machine is a rotating electrical machine according to the second or third rotating electrical machine, in which the bracket includes a side wall for surrounding the detector.

The fifth rotating electrical machine is a rotating electrical machine according to any one of the second to fourth rotating electrical machines, in which the bracket includes a cable connecting portion by which the cable guided to the bracket and the cable guided to the first housing portion are connected to each other at a location closer to the first housing portion than the detector.

Additional effects and modifications can be easily achieved by those having ordinary skills in the art. Therefore, wider aspects of the present disclosure are not limited to the particular detailed and representative embodiment described above. Accordingly, the aspects of the present disclosure can be variously modified without departing from the spirit and scope of the general concept of the disclosure defined by accompanying claims and their equivalents.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A rotating electrical machine comprising:
   a frame including a first housing portion for housing an electronic component and a second housing portion formed integrally with the first housing portion for housing a rotator and a stator; and
   a bracket including a first communicating hole communicating with the first housing portion, a second communicating hole communicating with the second housing portion, and a third housing portion for housing a detector for detecting a rotation angle of the rotator, the first communication hole connecting the first housing portion and the third housing portion, the second communication hole connecting the second housing portion and the third housing portion.

2. The rotating electrical machine according to claim 1,
   wherein the frame includes a first end face adjacent to the first and second housing portions, and
   wherein the bracket is attached so as to cover the first end face.

3. The rotating electrical machine according to claim 2, wherein the first end face is substantially orthogonal to the rotation axis of the rotator.

4. The rotating electrical machine according to claim 1, wherein the first and second communicating holes are arranged substantially parallel to one another.

5. The rotating electrical machine according to claim 1,
   wherein the first communicating hole guides a cable for the detector connected to the detector to the first housing portion.

6. The rotating electrical machine according to claim 1, wherein the bracket includes a side wall for surrounding the detector.

7. The rotating electrical machine according to claim 1, wherein the frame includes a first refrigerant passage provided between the first housing portion and the stator.

8. The rotating electrical machine according to claim 7, wherein the frame includes:
   an inner wall having a shape corresponding to a shape of an outer periphery of the stator;
   an outer wall provided outside the inner wall; and
   a second refrigerant passage provided between the inner wall and the outer wall.

9. The rotating electrical machine according to claim 8, wherein the second refrigerant passage extends along the rotation axis of the rotator.

10. The rotating electrical machine according to claim 1, wherein the frame includes:
    an inner wall having a shape corresponding to a shape of an outer periphery of the stator;
    an outer wall provided outside the inner wall; and
    a refrigerant passage provided between the inner wall and the outer wall.

11. The rotating electrical machine according to claim 10, wherein the refrigerant passage extends along the rotation axis of the rotator.

* * * * *